(12) United States Patent
Yang et al.

(10) Patent No.: US 11,132,026 B2
(45) Date of Patent: Sep. 28, 2021

(54) ELECTRONIC DEVICE

(71) Applicant: Acer Incorporated, New Taipei (TW)

(72) Inventors: Yi-Hsuan Yang, New Taipei (TW); Cheng-Nan Ling, New Taipei (TW); Wu-Chen Lee, New Taipei (TW); Chia-Bo Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/879,781

(22) Filed: May 21, 2020

(65) Prior Publication Data

US 2021/0124398 A1 Apr. 29, 2021

Related U.S. Application Data

(60) Provisional application No. 62/925,752, filed on Oct. 24, 2019.

(30) Foreign Application Priority Data

Dec. 24, 2019 (TW) .................................. 108147328

(51) Int. Cl.
*G06F 1/16* (2006.01)
(52) U.S. Cl.
CPC .......... *G06F 1/1647* (2013.01); *G06F 1/1616* (2013.01); *G06F 1/1681* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,404,623 B1* | 6/2002 | Koshika | ................ | G06F 1/1616 345/87 |
| 9,501,097 B2* | 11/2016 | Moser | ................... | G06F 1/1649 |
| 10,198,039 B2* | 2/2019 | Perelli | ................... | G06F 1/1649 |
| 10,534,408 B2* | 1/2020 | Cheng | ................... | G06F 1/1616 |
| 10,545,534 B2* | 1/2020 | Ent | ........ | G06F 1/1618 |
| 10,635,142 B2* | 4/2020 | Cheng | ................... | G06F 1/1683 |
| 10,642,309 B2* | 5/2020 | Cheng | ................... | G06F 1/1616 |
| 10,788,854 B1* | 9/2020 | Liang | .................... | G06F 1/1616 |
| 2014/0104774 A1* | 4/2014 | Lu | ......... | G06F 1/1688 361/679.27 |
| 2018/0210504 A1* | 7/2018 | Moser | ................... | G06F 1/1649 |
| 2018/0373292 A1* | 12/2018 | Perelli | ..................... | G06F 1/165 |
| 2019/0171255 A1* | 6/2019 | Cheng | ................. | E05D 11/0054 |

(Continued)

FOREIGN PATENT DOCUMENTS

| | | |
|---|---|---|
| CN | 2671027 | 1/2005 |
| CN | 201222208 | 4/2009 |

(Continued)

*Primary Examiner* — Lisa Lea-Edmonds
(74) *Attorney, Agent, or Firm* — JCIPRNET (57) ABSTRACT

An electronic device includes a host, a driving mechanism, a main display, and an auxiliary display. The main display is connected to the host through the driving mechanism. The auxiliary display is located between the host and the main display. The auxiliary display has a pivoting end and a movable end, the pivoting end is pivotally connected to the host, and the movable end is connected to the driving mechanism. The main display is configured to be folded or unfolded with respect to the host and synchronously drive the auxiliary display to ascend or descend through the driving mechanism.

9 Claims, 6 Drawing Sheets

(56) References Cited

U.S. PATENT DOCUMENTS

2020/0264672 A1* 8/2020 Morino .................. G06F 1/203
2021/0041915 A1* 2/2021 Moser ................... G06F 1/1605

FOREIGN PATENT DOCUMENTS

| CN | 108268093 | 7/2018 |
| TW | M258319 | 3/2005 |
| TW | 201424538 | 6/2014 |
| TW | I550384 | 9/2016 |
| TW | M562419 | 6/2018 |
| TW | M575549 | 3/2019 |
| TW | M576277 | 4/2019 |
| TW | I658773 | 5/2019 |

* cited by examiner

FIG. 3B

ELECTRONIC DEVICE

CROSS-REFERENCE TO RELATED APPLICATION

This application claims the priority benefit of U.S. provisional application Ser. No. 62/925,752, filed on Oct. 24, 2019, and Taiwan patent application serial no. 108147328, filed on Dec. 24, 2019. The entirety of each of the above-mentioned patent applications is hereby incorporated by reference here and made a part of this specification.

BACKGROUND

Technical Field

The disclosure relates to an electronic device, and more particularly, to an electronic device including a main display and an auxiliary display.

Description of Related Art

Notebook computers characterized by multiplexing capabilities, high computing performance, and portability have become indispensable to modern people. Generally speaking, the notebook computer includes a host and a display, hereinafter the display is pivotally connected to the host, and a keyboard set is integrated to the host.

To improve operation flexibility for users, a notebook computer having an auxiliary display integrated to the host has been launched. In detail, the auxiliary display and the keyboard set are located on the same working plane, and the auxiliary display and the keyboard set are juxtaposed. Since the angle and the height of the auxiliary display cannot be adjusted in most cases, it often brings inconvenience to the users as well as easily causes eye fatigue.

SUMMARY

The disclosure provides an electronic device characterized by operation flexibility.

According to an embodiment of the disclosure, an electronic device including a host, a driving mechanism, a main display, and an auxiliary display is provided. The main display is connected to the host through the driving mechanism. The auxiliary display is located between the host and the main display. The auxiliary display has a pivoting end and a movable end, the pivoting end is pivotally connected to the host, and the movable end is connected to the driving mechanism. The main display is configured to be folded or unfolded with respect to the host and synchronously drive the auxiliary display to ascend or descend through the driving mechanism.

Based on the above, the auxiliary display is integrated into the electronic device provided in one or more embodiments of the disclosure, and the angle and the height of the auxiliary display are adjustable, so that users may easily operate the auxiliary display, and that users' comfort of using the auxiliary display may be improved.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1A:
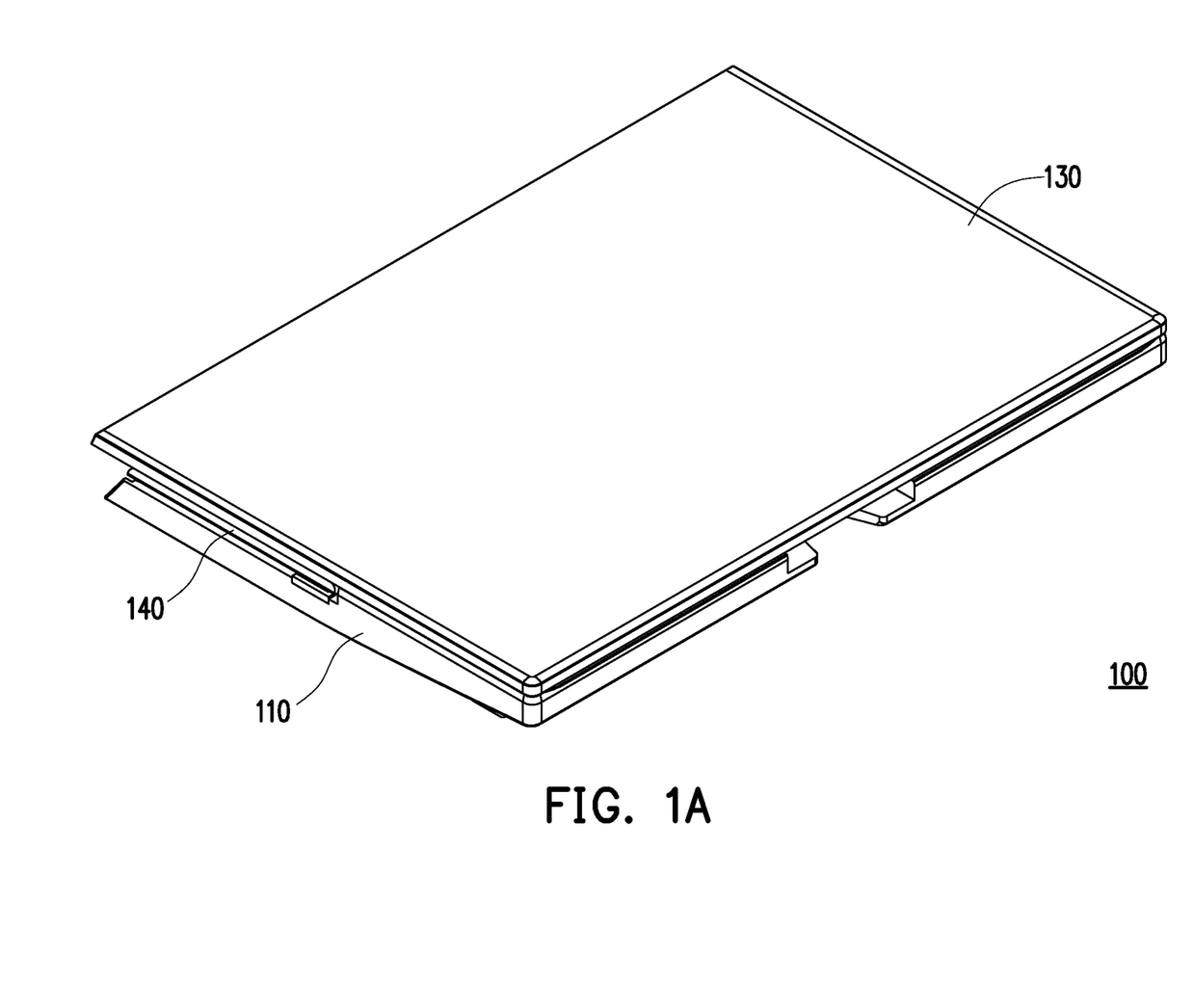
FIG. 1A is a schematic view of an electronic device in a folded state according to an embodiment of the disclosure.
Figure 1B:
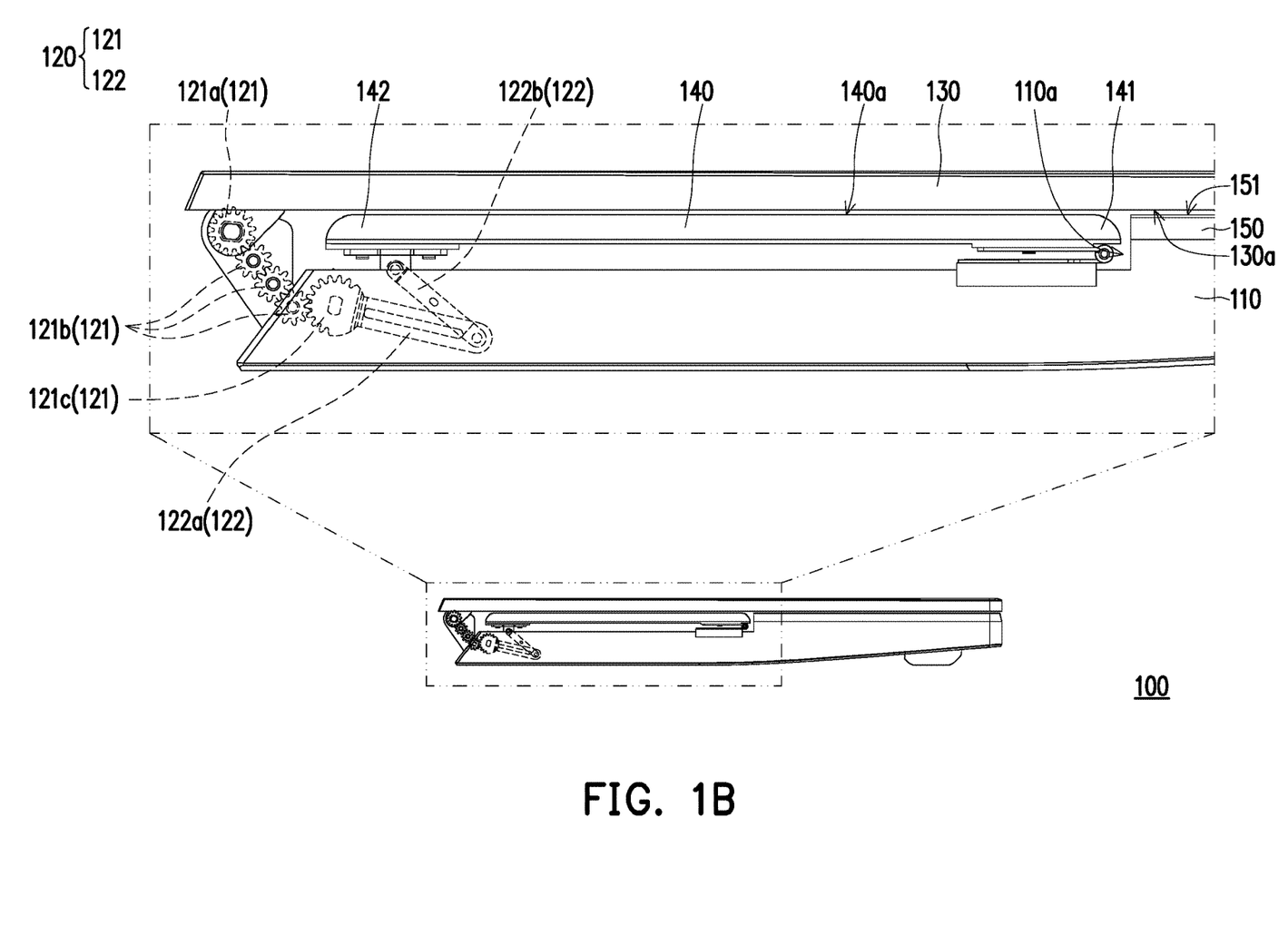
FIG. 1B is a schematic side view of the electronic device depicted in FIG. 1A.

FIG. 1A is a schematic view of an electronic device in a folded state according to an embodiment of the disclosure. FIG. 1B is a schematic side view of the electronic device depicted in FIG. 1A. With reference to FIG. 1A and FIG. 1B, in this embodiment, the electronic device 100 may be a notebook computer and includes a host 110, a driving mechanism 120, a main display 130, and an auxiliary display 140. The main display 130 is connected to the host 110 through the driving mechanism 120, and the main display 130 has a degree of freedom of movement with respect to the host 110, so as to be folded or unfolded with respect to the host 110.

When the main display 130 is in a folded state as shown in FIG. 1B, the main display 130 covers the host 110, and the auxiliary display 140 is located between the main display 130 and the host 110. On the other hand, a display surface 130a of the main display 130 faces a display surface 140a of the auxiliary display 140, and the display surface 130a of the main display 130 and the display surface 140a of the auxiliary display 140 are hidden inside, so as to protect the display surface 130a of the main display 130 and the display surface 140a of the auxiliary display 140 from being damaged by external forces or foreign objects.

In this embodiment, the auxiliary display 140 has a pivoting end 141 and a movable end 142, wherein the pivoting end 141 is pivotally connected to the host 110 and serves as a pivot of the auxiliary display 140. The movable end 142 is a force bearing point of the auxiliary display 140, and the driving mechanism 120 is configured to drive the movable end 142 to rotate and lift the auxiliary display 140 with respect to the host 110 or to rotate or lower down the auxiliary display 140 with respect to the host 110. On the other hand, the pivoting end 141 is integrated with torque accessories, so as to prevent the auxiliary display 140 from falling instantly.

Figure 2A:
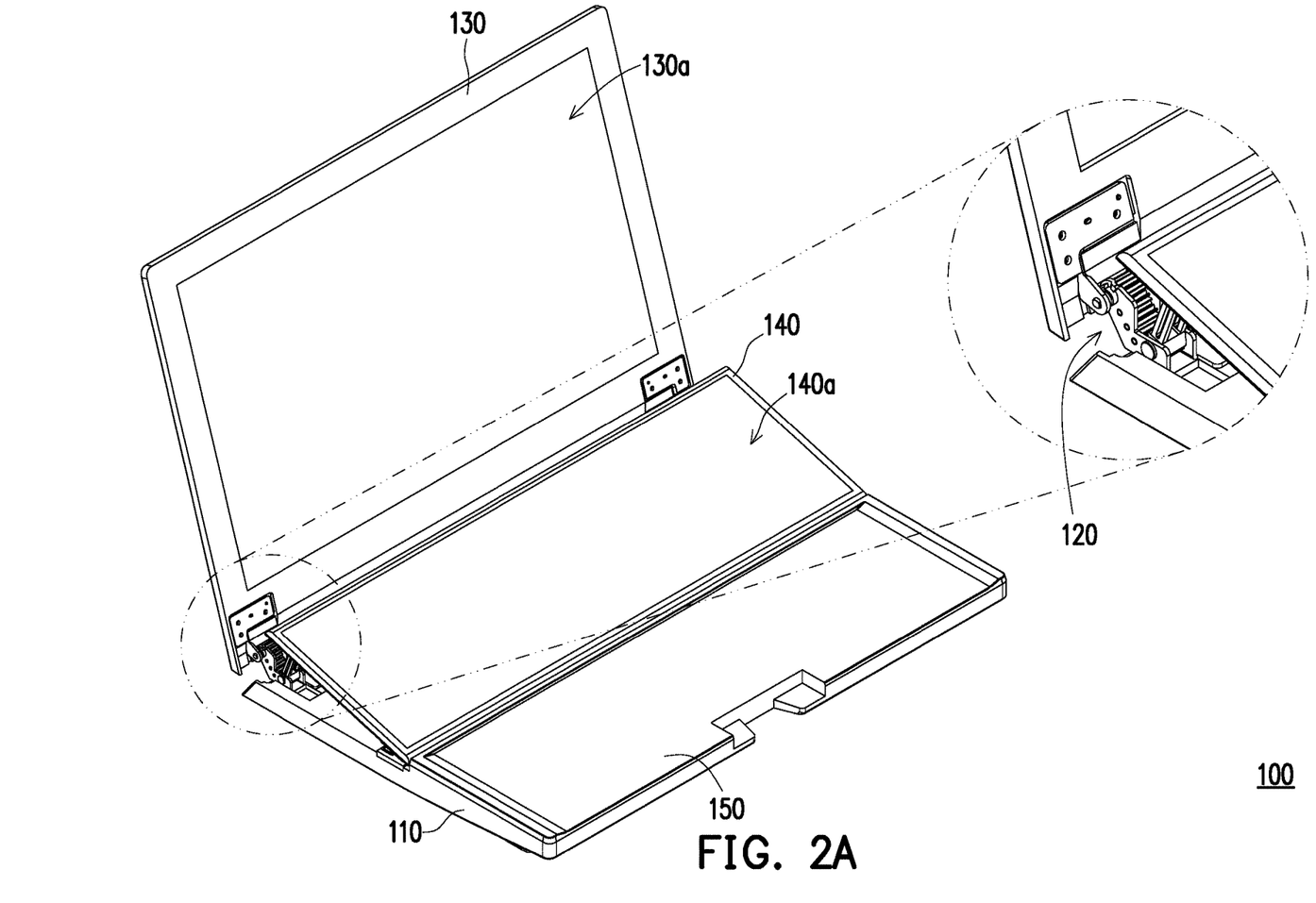
FIG. 2A is a schematic view illustrating the electronic device depicted in FIG. 1A is changed to a first unfolded state.
Figure 2B:
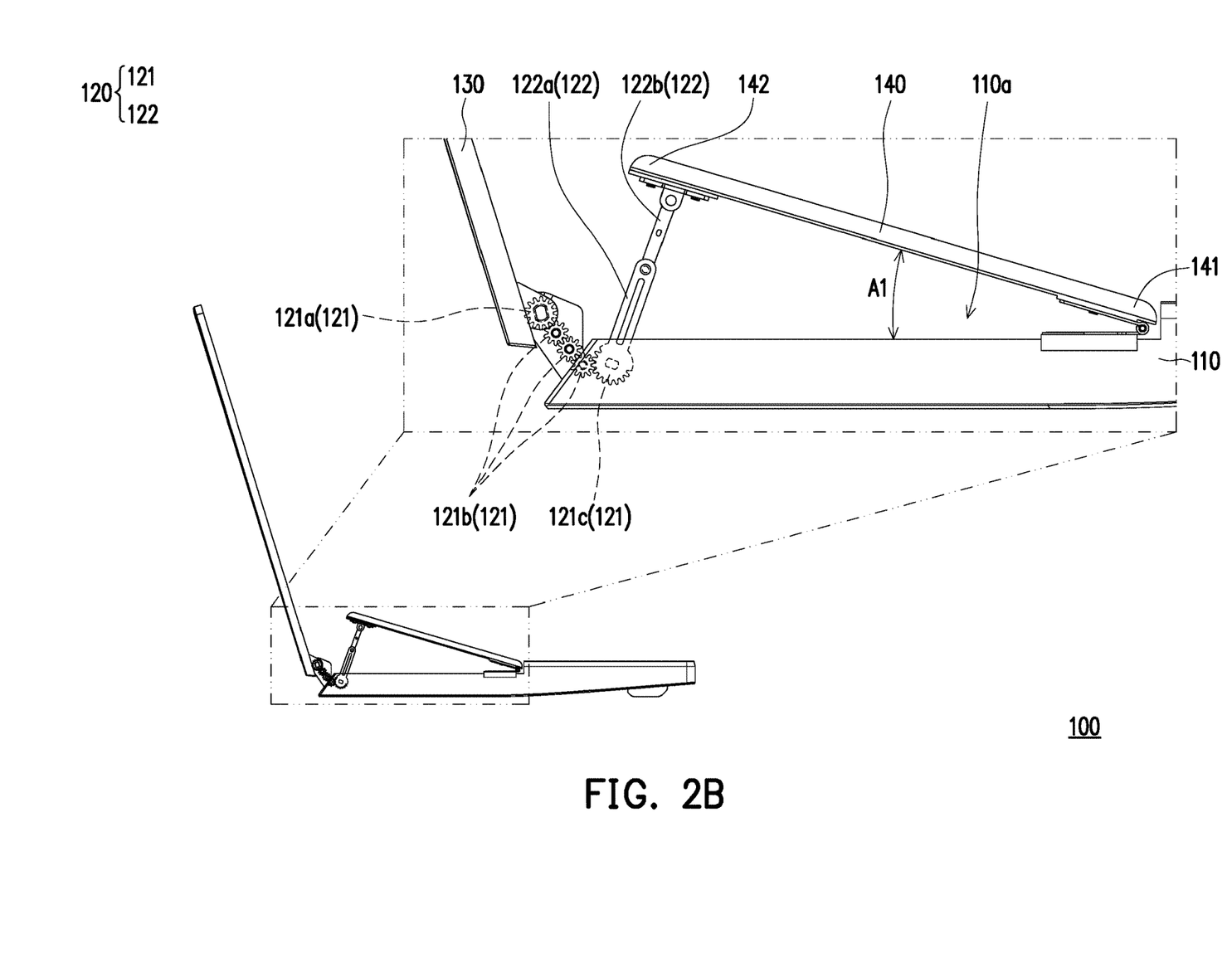
FIG. 2B is a schematic side view of the electronic device depicted in FIG. 2A.

FIG. 2A is a schematic view illustrating the electronic device depicted in FIG. 1A is changed to a first unfolded state. FIG. 2B is a schematic side view of the electronic device depicted in FIG. 2A. With reference to FIG. 1B, FIG. 2A, and FIG. 2B, in this embodiment, the movable end 142 is connected to the driving mechanism 120. When the main display 130 rotates away from the host 110, the main display 130 synchronously drives the movable end 142 through the driving mechanism 120, so that the auxiliary display 140 is rotated and lifted with respect to the host 110. On the contrary, when the main display 130 rotates close to the host 110, the main display 130 synchronously drives the movable end 142 through the driving mechanism 120, so that the auxiliary display 140 is rotated and lowered down with respect to the host 110.

During the process of folding and unfolding the main display 130 with respect to the host 110, the driving mechanism 120 may synchronously drive the auxiliary display 140 to ascend or descend. Therefore, from the users' perspective, the operation of the electronic device 100 is simple and intuitive. In another aspect, the angle and the height of the auxiliary display 140 are adjustable, so that users may easily operate the auxiliary display 140, and that users' comfort of using the auxiliary display 140 may be improved.

In this embodiment, the electronic device 100 further includes a keyboard assembly 150, wherein the auxiliary display 140 and the keyboard assembly 150 are juxtaposed, and the pivoting end 141 is located between the movable end 142 and the keyboard assembly 150. In another aspect, the host 110 has a groove 110a for accommodating the auxiliary display 140, which is conducive to the improvement of the appearance integrity of the electronic device 100. Further, the groove 110a and the keyboard assembly 150 are juxtaposed, and the keyboard assembly 150 has an operation surface 151. When the auxiliary display 140 is disposed in the groove 110a, the display surface 140a of the auxiliary display 140 is coplanar with or slightly lower than the operation surface 151 of the keyboard assembly 150, so as to prevent the main display 130 from squeezing the display surface 140a of the auxiliary display 130.

As shown in FIG. 1B and FIG. 2B, when the main display 130 rotates away from the host 110, the auxiliary display 140 driven by the driving mechanism 120 rotates synchronously. The auxiliary display 140 rotates with respect to the host 110 and moves out of the groove 110a, but the pivoting end 141 is still located in the groove 110a. During the transition from the folded state shown in FIG. 1B to the first unfolded state shown in FIG. 2B, a rotation direction of the main display 130 is opposite to a rotation direction of the auxiliary display 140. On the other hand, in the first unfolded state shown in FIG. 2B, a first angle A1 is included between the auxiliary display 140 and a bottom surface of the groove 110a.

As shown in FIG. 1B, FIG. 2A, and FIG. 2B, in this embodiment, the driving mechanism 120 includes a gear assembly 121 and a linkage assembly 122 and is disposed among the main display 130, the host 110, and the auxiliary display 140. The main display 130 is connected to the gear assembly 121, and the linkage assembly 122 is connected to the gear assembly 121 and the movable end 142 of the auxiliary display 140. Specifically, the gear assembly 121 includes a first gear 121a, a plurality of auxiliary gears 121b, and a second gear 121c, the number of the auxiliary gears 121b is an odd number, and the auxiliary gears 121b are arranged between the first gear 121a and the second gear 121c. The auxiliary gears 121b are engaged with one another, the first gear 121a is engaged with one of the auxiliary gears 121b, and the second gear 121c is engaged with another of the auxiliary gears 121b. Since the number of the auxiliary gears 121b is an odd number, a rotation direction of the first gear 121a is the same as a rotation direction of the second gear 121c.

In this embodiment, the main display 130 is connected to the first gear 121a, and the linkage assembly 122 is connected to the second gear 121c. In another aspect, the main display 130 may be fixed to the first gear 121a through a rotation axle, and the rotation axle is integrated with torque accessories, so as to prevent the main display 130 from falling instantly.

As shown in FIG. 1B and FIG. 2B, when the main display 130 rotates away from the host 110, the first gear 121a synchronously rotates and drives the auxiliary gears 121b, and the auxiliary gears 121b drive the second gear 121c to rotate. At this time, the second gear 121c drives the linkage assembly 122 to rotate, so that the linkage assembly 122 drives the auxiliary display 140 to rotate and lift with respect to the host 110.

In this embodiment, the linkage assembly 122 includes a first link 122a and a second link 122b and is disposed between the host 110 and the auxiliary display 140. One end of the first link 122a is connected to the gear assembly 121, the other end of the first link 122a is pivotally connected to one end of the second link 122b, and the other end of the second link 122b is pivotally connected to the movable end 142 of the auxiliary display 140.

Further, since one end of the first link 122a is connected to the second gear 121c, a rotation direction of the first link 122a is the same as the rotation direction of the main display 130. On the other hand, when the main display 130 rotates away from the host 110, the first gear 121a rotates synchronously and drives the auxiliary gears 121b, and the auxiliary gears 121b drive the second gear 121c to rotate. At this time, the second gear 121c drives the first link 122a to rotate and lift the auxiliary display 140 through the first link 122a and the second link 122b. During the process of lifting the auxiliary display 140 through the first link 122a and the second link 122b, the first link 122a and the second link 122b are relatively rotated, the rotation direction of the first link 122a is opposite to a rotation direction of the second link 122b, and an angle between the first link 122a and the second link 122b (i.e., an angle facing the gear assembly 121 or the main display 130) continues to increase.

Figure 3A:
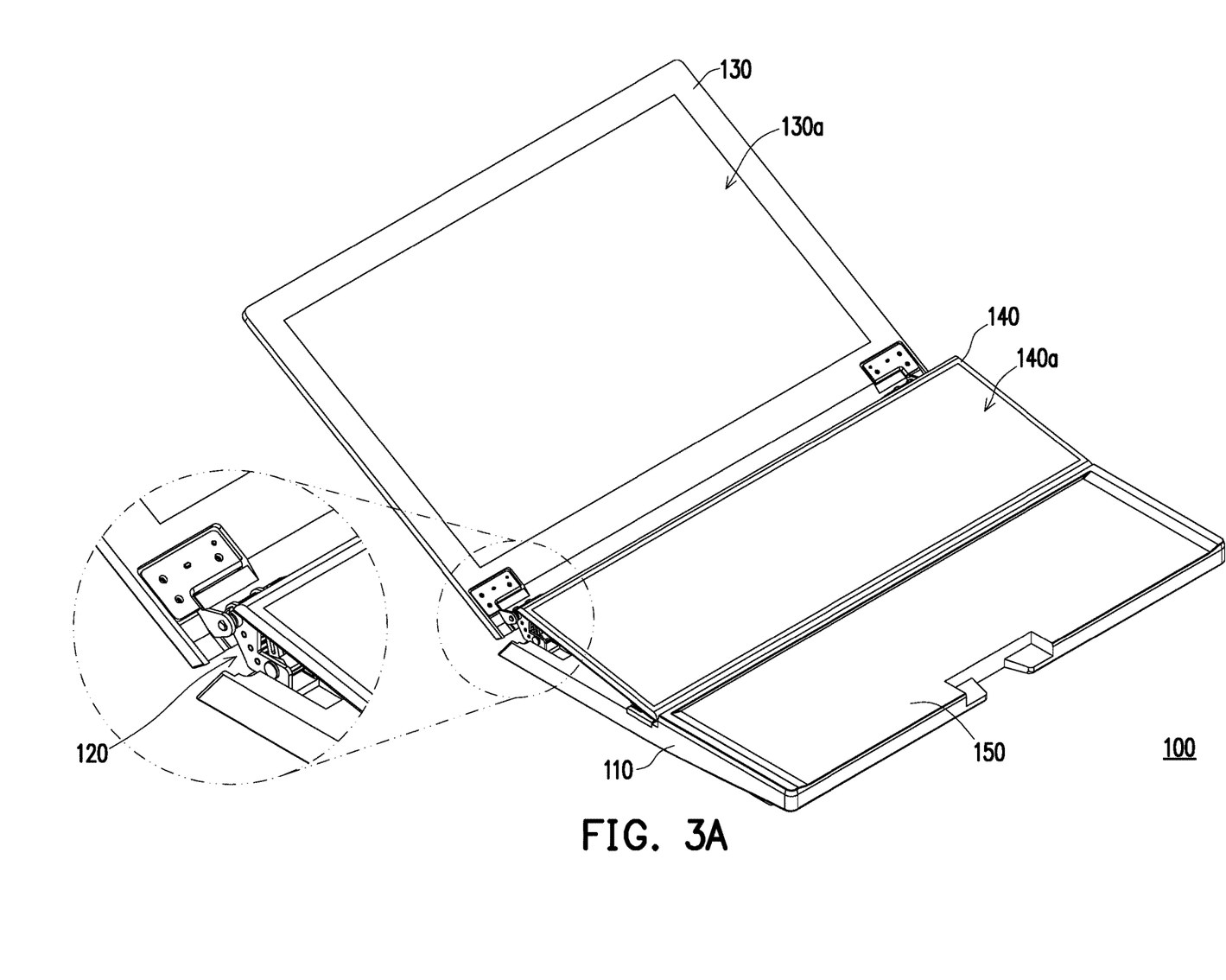
FIG. 3A is a schematic view illustrating the electronic device depicted in FIG. 2A is changed to a second unfolded state.
Figure 3B:
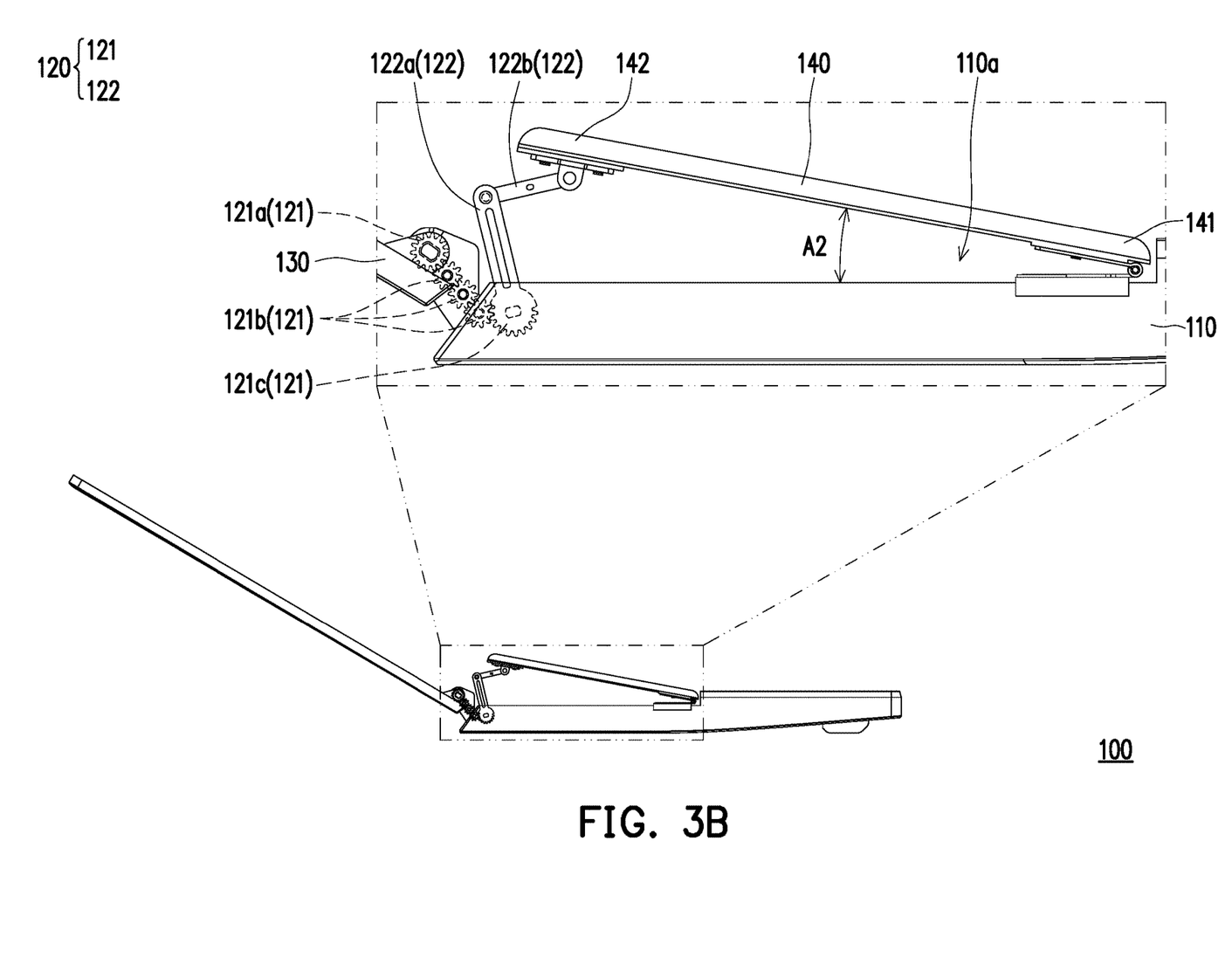
FIG. 3B is a schematic side view of the electronic device depicted in FIG. 3A.

FIG. 3A is a schematic view illustrating the electronic device depicted in FIG. 2A is changed to a second unfolded state. FIG. 3B is a schematic side view of the electronic device depicted in FIG. 3A. In the first unfolded state shown in FIG. 2B, the first link 122a and the second link 122b are arranged in a straight line. When the main display 130 continues to rotate away from the host 110, the first link 122a rotates with respect to the host 110, and the rotation direction of the main display 130 is the same as the rotation direction of the first link 122a. At the same time, the second link 122b is driven to rotate with respect to the first link 122a, and the rotation direction of the second link 122b is opposite to the rotation direction of the first link 122a. At this time, the second link 122b approaches the host 110, so that the auxiliary display 140 sinks slightly to prevent blocking the display surface 130a of the main display 130, as shown in FIG. 3A and FIG. 3B.

In the second unfolded state shown in FIG. 3B, a second angle A2 is included between the auxiliary display 140 and the bottom surface of the groove 110a, and the second angle A2 is smaller than the first included angle A1. In the first unfolded state shown in FIG. 2B, the auxiliary display 140 has a maximum lifting angle and a maximum lifting height.

During the transition from the folded state shown in FIG. 1B to the first unfolded state shown in FIG. 2B, the main display 130 and the auxiliary display 140 synchronously rotate away from the host 110, and the rotation direction of the main display 130 is opposite to the rotation direction of the auxiliary display 140. During the transition from the first unfolded state shown in FIG. 2B to the second unfolded state shown in FIG. 3B, the main display 130 continues to rotate away from the host 110; however, the auxiliary display 140 rotates and approaches the host 110; here, the rotation direction of the main display 130 is the same as the rotation direction of the auxiliary display 140.

To sum up, the auxiliary display is integrated into the electronic device provided in one or more embodiments of the disclosure, and the angle and the height of the auxiliary display are adjustable, so that users may easily operate the auxiliary display, and that users' comfort of using the auxiliary display may be improved. Further, during the process of folding and unfolding the main display with respect to the host, the main display may, through the driving mechanism, synchronously drives the auxiliary display to ascend or descend, and thus the operation is simple and intuitive. In other words, the users need not manually adjust the angle and the height of the auxiliary display.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a host;
   a driving mechanism;
   a main display, connected to the host through the driving mechanism; and
   an auxiliary display, located between the host and the main display and comprising a pivoting end and a movable end, wherein the pivoting end is pivotally connected to the host, the movable end is connected to the driving mechanism, the main display is configured to be folded or unfolded with respect to the host and synchronously drive the auxiliary display to ascend or descend through the driving mechanism, wherein the driving mechanism comprises a gear assembly and a linkage assembly, the main display is connected to the gear assembly, and the linkage assembly is connected to the gear assembly and the movable end.

2. The electronic device according to claim 1, further comprising a keyboard assembly, wherein the auxiliary display and the keyboard assembly are juxtaposed, and the pivoting end is located between the movable end and the keyboard assembly.

3. The electronic device according to claim 2, wherein the host has a groove, the auxiliary display has a display surface, the keyboard assembly has an operation surface, the auxiliary display is disposed in the groove, and the display surface is coplanar with the operation surface.

4. The electronic device according to claim 1, wherein the host has a groove, and the auxiliary display is disposed in the groove.

5. The electronic device according to claim 1, wherein the gear assembly comprises a first gear, a plurality of auxiliary gears, and a second gear, the auxiliary gears are arranged between the first gear and the second gear, the main display is connected to the first gear, and the linkage assembly is connected to the second gear.

6. The electronic device according to claim 5, wherein the number of the auxiliary gears is an odd number, the auxiliary gears are engaged with one another, the first gear is engaged with one of the auxiliary gears, and the second gear is engaged with another of the auxiliary gears.

7. The electronic device according to claim 5, wherein the linkage assembly comprises a first link and a second link pivotally connected to the first link, the first link is connected to the second gear, and the second link is pivotally connected to the movable end.

8. The electronic device according to claim 1, wherein the linkage assembly comprises a first link and a second link pivotally connected to the first link, the first link is connected to the gear assembly, and the second link is pivotally connected to the movable end.

9. The electronic device according to claim 8, wherein a rotation direction of the main display is the same as a rotation direction of the first link, when the main display rotates away from the host, the main display, through the gear assembly, synchronously drives the first link to rotate, so that the first link and the second link lift the auxiliary display, and after the first link and the second link are arranged in a straight line, the second link rotates with respect to the first link and approaches the host, so that the auxiliary display sinks.

* * * * *